UNITED STATES PATENT OFFICE.

JAMES N. WHITMAN, OF PHILADELPHIA, PENNSYLVANIA, ASSIGNOR OF ONE-HALF TO MARCUS T. REYNOLDS, OF ALBANY, NEW YORK.

PROCESS OF MANUFACTURING IRON DIRECT FROM ITS OXIDS.

No. 820,898.     Specification of Letters Patent.     Patented May 15, 1906.

Application filed February 23, 1906. Serial No. 302,584.

*To all whom it may concern:*

Be it known that I, JAMES N. WHITMAN, a citizen of the United States, residing in Philadelphia, in the county of Philadelphia and State of Pennsylvania, have invented certain new and useful Improvements Relating to Processes of Manufacturing Iron Direct from its Oxids, of which the following is a specification.

The manufacture of wrought-iron direct from the ore while one of the earliest methods practiced has been largely superseded because of the increasing difficulties in securing ores of sufficient purity and richness to yield a good product, as well as because of the greater expense of such processes as compared with other processes of manufacturing both iron and steel in general practice at the present day. For illustration, the product of the Catalan forge was of notably superior quality where pure ores were used with charcoal as fuel; but recent developments in blast-furnace practice have so reduced the cost of pig-iron that the puddling-furnaces now furnish practically all of the wrought-iron, and although cheaper it is not of equal quality and is not sufficiently cheap to successfully complete with steel even for purposes for which wrought-iron would be preferable.

The object of the present invention is to cheapen and improve the process of manufacture direct from the ore and whereby when desired lower grades of ore and ore not readily available for other processes without treatment may be successfully utilized in the production of both wrought-iron and steel.

In accordance with the present invention ore may be supplied from any of the large deposits of lean and impure iron ore to be found in many sections of the country, and as a preliminary step such ore is comminuted by crushing and mechanically separated or concentrated, whereby such impurities as can be mechanically separated are eliminated. The comminution of the ore is such as to render it unfit for use in a blast-furnace or forge, and this material or ore is in accordance with the present invention further purified by the elimination of its volatile impurities through the agency of heat under oxidizing conditions and with or without the addition of proper chemical reagents, as the case may require, after which it is subjected to heat and agitation under deoxidizing conditions. This treatment results in agglomerating the material into masses adapted to be handled commercially. The material under treatment is then subjected to a higher temperature and the gangue content fused, so that the product may be balled, squeezed, hammered, or rolled into bars of merchantable form.

The invention may be carried into practice with known apparatus, and many forms will at once suggest themselves—such, for instance, as a succession of rotary furnaces through which the material passes in succession, or a single rotary furnace may be employed by simply changing the atmosphere and temperature to suit the different stages in the process. While the former would perhaps best meet commercial requirements, the latter is well adapted for the manipulation of small batches or for demonstration.

As a concrete illustration of the invention the ore is first crushed to a fine powder and then concentrated magnetically or by the use of water-jigs, concentrators, washers, or leaching devices. The crushed concentrate (washed or leached material) is then carried, preferably by mechanical means, to a rotary furnace, into which it is fed in an oxidizing atmosphere for the purpose of expelling moisture and volatile impurities. For the complete removal or elimination of remaining impurities suitable reagents, such as a very small quantity of lime, may be added, preferably after the more volatile impurities have been driven off and during the maintenance of the oxidizing atmosphere. To deoxidize, carburize, and agglomerate and reduce or partially reduce, additions of carbonaceous material carrying free carbon may be made, or the atmosphere of the furnace is otherwise changed by charging it with free carbon to a deoxidizing atmosphere of a reducing character and carrying carbon in excess. This condition is continued until the proper reaction has taken place, when for the complete reduction the atmosphere is changed to one of higher temperature and maintained until the charge is reduced, the separation of the molten gangue or scoria and the balling being effected mechanically by the rotary action of the furnace, after which the material may be taken to a hammer or squeezer, the molten cinder and slag expelled therefrom, and the loup or bloom made ready for the finishing operation of the rolls or forging-hammer.

Obviously the process may be arrested before the charge is subjected to the final high-temperature conditions in the furnace, under which circumstances the material will be found to be agglomerated in masses of appreciable size, usually in the form of what is known as "sponge," being well adapted for melting stock for open-hearth furnaces. The material at this stage is carburized, partially deoxidized, and partially reduced and might well be utilized in any of the well-known forms of puddling plants, the puddling operation simply consisting in melting the gangue content, thereby finishing the process of reduction and balling the metallic iron, as usual.

The present process avoids the necessity of the blast-furnace element in the manufacture of wrought-iron and produces from inferior material metal of superior quality.

While the process for commercial reasons is especially applicable in handling the class of ores to which attention has been specifically directed, it is to be understood that ores of better grade may also be economically handled in accordance with the process and that the product may be utilized not alone in the manufacture of wrought-iron, but also in the manufacture of iron and steel in accordance with well-known practice.

What I claim is—

1. The improvement in processes of manufacturing iron direct from its ores, which consists in subjecting the ore to heat under oxidizing conditions to eliminate volatile impurities, and as a successive step, subjecting the purified ore to heat and agitation under deoxidizing and carburizing conditions produced by the introduction of free carbon, to partially deoxidize, carburize, partially reduce and agglomerate the ore into coherent masses.

2. The improvement in processes of manufacturing iron direct from its ores, which consists in comminuting and mechanically purifying the ore, then subjecting the comminuted ore to heat under oxidizing conditions to eliminate volatile impurities, then subjecting the ore to heat and agitation under deoxidizing and carburizing conditions produced by the introduction of free carbon, to partially deoxidize, partially reduce and agglomerate the ore into coherent masses.

3. The improvement in processes of manufacturing iron direct from its ores, which consists in subjecting the ore to heat under oxidizing conditions to eliminate volatile impurities, then subjecting the ore to heat and agitation under deoxidizing and carburizing conditions produced by the introduction of free carbon, to partially deoxidize, partially reduce and agglomerate the ore into coherent masses and then subjecting the product to higher-temperature and reducing conditions to effect complete reduction.

4. The improvement in processes of manufacturing iron direct from its ores, which consists in comminuting and mechanically purifying the ore, then subjecting the comminuted ore to heat under oxidizing conditions to eliminate volatile impurities, then subjecting the ore to heat and agitation under deoxidizing and carburizing conditions produced by the introduction of free carbon, to partially deoxidize, partially reduce and agglomerate the ore into coherent masses and then subjecting the product to higher-temperature and reducing conditions to effect complete reduction.

5. The improvement in processes of manufacturing iron direct from its ores, which consists in subjecting the ore to heat under oxidizing conditions and in the presence of a reagent for the removal and elimination of impurities and as a successive step subjecting the purified ore to heat and agitation under deoxidizing and carburizing conditions produced by the introduction of free carbon, to partially deoxidize, carburize, partially reduce and agglomerate the ore into coherent masses.

6. The improvement in processes of manufacturing iron direct from its ores, which consists in subjecting the ore to heat under oxidizing conditions to eliminate the more volatile impurities, then adding a reagent in the presence of heat to remove and eliminate remaining impurities, then subjecting the ore to heat and agitation under deoxidizing and carburizing conditions produced by the introduction of free carbon, to partially deoxidize, partially reduce and agglomerate the ore into coherent masses.

7. The improvement in processes of manufacturing iron direct from its ores, which consists in subjecting the ore to heat under oxidizing conditions to eliminate the more volatile impurities, then adding a reagent in the presence of heat to remove and eliminate remaining impurities, then subjecting the ore to heat and agitation under deoxidizing and carburizing conditions produced by the introduction of free carbon, to partially deoxidize, partially reduce and agglomerate the ore into coherent masses, then subjecting the product to higher-temperature and reducing conditions to effect complete reduction.

JAMES N. WHITMAN.

Witnesses:
- THOMAS DURANT,
- ALEXANDER S. STEWART.